(12) United States Patent
Wang et al.

(10) Patent No.: US 10,335,739 B2
(45) Date of Patent: *Jul. 2, 2019

(54) SPIRAL WOUND MEMBRANE ELEMENT AND METHOD FOR CLEANING SPIRAL WOUND MEMBRANE SHEET

(75) Inventors: Chang Wang, Shanghai (CN); Chen Wang, Shanghai (CN)

(73) Assignee: BL TECHNOLOGIES, INC., Minnetonka, MN (US)

( * ) Notice: Subject to any disclaimer, the term of this patent is extended or adjusted under 35 U.S.C. 154(b) by 445 days.

This patent is subject to a terminal disclaimer.

(21) Appl. No.: 14/395,112

(22) PCT Filed: Apr. 18, 2012

(86) PCT No.: PCT/CN2012/074256
§ 371 (c)(1),
(2), (4) Date: Oct. 17, 2014

(87) PCT Pub. No.: WO2013/155682
PCT Pub. Date: Oct. 24, 2013

(65) Prior Publication Data
US 2015/0060359 A1   Mar. 5, 2015

(51) Int. Cl.
*B01D 63/10* (2006.01)
*B01D 65/02* (2006.01)
*B01D 61/12* (2006.01)

(52) U.S. Cl.
CPC ............ *B01D 63/10* (2013.01); *B01D 61/12* (2013.01); *B01D 63/103* (2013.01);
(Continued)

(58) Field of Classification Search
None
See application file for complete search history.

(56) References Cited

U.S. PATENT DOCUMENTS 4,792,401 A   12/1988  Truex et al.
4,814,079 A   3/1989   Schneider
(Continued)

FOREIGN PATENT DOCUMENTS

CN   1432427 A   7/2003
CN   1642624 A   7/2005
(Continued)

OTHER PUBLICATIONS

European Search Report issued in connection with corresponding EP Application No. 12874399.4 dated Nov. 17, 2015.
(Continued)

*Primary Examiner* — Bobby Ramdhanie
*Assistant Examiner* — Michael J An (57) ABSTRACT

A spiral wound membrane element and a method for cleaning a spiral wound membrane sheet are provided. The spiral wound membrane element comprising a perforated central tube; one or more membrane sleeves, each sleeve comprising two membrane sheets enclosed at two edges around a feed spacer sheet and wrapped around the central tube; a permeate carrier sheet attached to the central tube at a first edge opposite a second edge; and a seal on third and fourth edges of the permeate carrier sheet. The method comprises introducing two solution with different solute concentration to two sides of the spiral wound membrane sheet; establishing a concentration gradient between the first and second sides; communicating a first solvent from the first side to the second side to remove a foulant located on the second side of the membrane sheet; and collecting a waste stream that contains the foulant.

7 Claims, 6 Drawing Sheets

(52) U.S. Cl.
CPC ........... *B01D 63/106* (2013.01); *B01D 65/02* (2013.01); *B01D 2313/04* (2013.01); *B01D 2313/08* (2013.01); *B01D 2313/12* (2013.01); *B01D 2313/18* (2013.01); *B01D 2313/19* (2013.01); *B01D 2313/23* (2013.01); *B01D 2321/00* (2013.01); *B01D 2321/06* (2013.01)

(56) References Cited

U.S. PATENT DOCUMENTS

| | | | | |
|---|---|---|---|---|
| 5,128,037 | A | * | 7/1992 | Pearl .................... B01D 61/10 210/321.74 |
| 5,250,118 | A | | 10/1993 | Netwig et al. |
| 5,275,726 | A | | 1/1994 | Feimer et al. |
| 5,470,469 | A | * | 11/1995 | Eckman ................ B01D 63/02 210/321.78 |
| 5,817,235 | A | | 10/1998 | Tortosa |
| 6,533,937 | B1 | | 3/2003 | Adachi et al. |
| 6,656,362 | B1 | | 12/2003 | Kihara et al. |
| 6,881,336 | B2 | | 4/2005 | Johnson |
| 7,396,463 | B2 | | 7/2008 | Moeller |
| 7,410,581 | B2 | | 8/2008 | Arnold et al. |
| 7,563,375 | B2 | | 7/2009 | Liberman |
| 2003/0127388 | A1 | | 7/2003 | Ando et al. |
| 2004/0134521 | A1 | * | 7/2004 | Liberman ............ B01D 61/002 134/34 |
| 2005/0121380 | A1 | * | 6/2005 | De La Cruz ........... B01D 63/10 210/321.83 |
| 2009/0026130 | A1 | * | 1/2009 | Chikura ................ B01D 63/10 210/500.23 |
| 2009/0120873 | A1 | | 5/2009 | Becker et al. |
| 2009/0314713 | A1 | | 12/2009 | Shelby et al. |

FOREIGN PATENT DOCUMENTS

| | | |
|---|---|---|
| CN | 1655863 A | 8/2005 |
| CN | 201578990 U | 9/2010 |
| EP | 0492250 A1 | 7/1992 |
| EP | 2008705 A1 | 12/2008 |
| WO | 200027511 A1 | 5/2000 |
| WO | 0044481 A1 | 8/2000 |
| WO | 2004000445 A1 | 12/2003 |
| WO | 2005070524 A1 | 8/2005 |
| WO | 2005123232 A2 | 12/2005 |

OTHER PUBLICATIONS

Bartels et al., "Performance advancement in the spiral wound RO/NF element design", EDS Conference, pp. 1-9, Apr. 2007.
International Search Report and Written Opinion issued in connection with corresponding PCT Application No. PCT/CN2012/074256 dated Jan. 31, 2013.
European Search Report and Written Opinion issued in connection with corresponding EP Application No. 12874399.4-1370 dated May 27, 2016.
Rizzone et al., "Recent Advances in Spiral Wound Ultrafiltration Technology for E-Coat Paint", PCT Painting & Coatings Industry, Electrocoat 2006 Conference, Florida, pp. 48-53, Oct. 2006.
PCT Search Report and Written Opinion issued in connection with related PCT Application No. PCT/CN2011/001580 dated Jun. 28, 2012.
GC Examination Report issued in connection with related GC Application No. 201222276 dated Aug. 9, 2016.
Taiwan Office Action issued in connection with related TW Application No. 101133382 dated Jan. 19, 2017.
U.S. Non-Final Office Action issued in connection with related U.S. Appl. No. 14/345,750 dated Apr. 21, 2017.
U.S. Notice of Allowance issued in connection with related U.S. Appl. No. 14/345,750 dated Aug. 17, 2017.

* cited by examiner

SPIRAL WOUND MEMBRANE ELEMENT AND METHOD FOR CLEANING SPIRAL WOUND MEMBRANE SHEET

CROSS-REFERENCE TO RELATED APPLICATIONS

This application is a National Stage Entry of International Application No. PCT/CN2012/074256, filed Apr. 18, 2012. International Application No. PCT/CN2012/074256 is incorporated by reference.

FIELD

The present disclosure relates generally to spiral wound membrane elements and modules.

BACKGROUND

The following discussion is not an admission that anything discussed below is citable as prior art or common general knowledge.

A spiral wound membrane element is typically made by wrapping one or more membrane leaves and feed spacer sheets around a perforated central tube. The membrane leaves each have a permeate carrier sheet placed between two generally rectangular membrane sheets. The membrane sheets are typically sealed together along three edges. The fourth edge of the membrane leaves is adjacent to the central tube and open to the perforations. One or more layers of permeate carrier sheet can also be wrapped around the central tube to support the membrane leaf over the perforations in the central tube and to provide a flow path between the edge of the leaf and the central tube. An anti-telescoping device (ATD) may be attached at the ends of the membrane element to prevent telescopic unraveling of the membrane element.

Feedstock, also referred to as feed water, is introduced at one end of the membrane element and flows through the feed spacer sheets and along a feed-side of the membrane sheets. Some of the feedstock passes through the membrane sheets to form a permeate stream on a permeate-side of the membrane sheets. The remainder of the feedstock, referred to as the reject, retentate or brine stream, flows through the feed spacer sheets and out of an outlet end of the membrane element. The permeate stream flows along the permeate carrier in an inwardly spiraling flow. The permeate stream follows the permeate carrier until reaching and exiting the fourth edge of the membrane leaves and entering the central tube by the perforations. Within the central tube, the permeate stream is collected and transported towards an outlet end of the central tube.

The throughput or collection rate of permeate in a spiral wound membrane is related to the pressure applied across the membrane. However, the pressure required to drive the permeate flow through the permeate carrier, including from the edges of the permeate carrier, towards the central tube reduces the net driving pressure for permeate flow through the membrane.

Additionally, the feed-side surface of the membrane sheets may accumulate particles, also referred to as foulants, which can further decrease the net driving pressure for permeate flow through the membrane.

SUMMARY

A spiral wound membrane element, to be described in further detail below, comprises fluid communication between a perforated central tube and a peripheral region of the spiral wound membrane element.

The spiral wound membrane element includes a wrapping of one or more membrane sleeves and one or more permeate carrier sheets around the perforated central tube. For the purposes of this disclosure, the term "membrane sleeve" shall refer to a sleeve of one or more membrane sheets that surround a feed spacer, optionally with the membrane sleeve being sealed at two edges. A feedstock may flow through the unsealed or open edges of the feed spacer and along the feed-side surface of the membrane sheets. The feed-side is also referred to as the inner surface of the membrane sheets. A permeate carrier sheet is positioned between two membrane sheets. The permeate carrier sheet has two open edges and two closed edges. One open edge is open to the central tube and the second open edge is open to the cross-sectional periphery of the spiral wound membrane element.

The cross-section of the spiral wound membrane element of the present invention may have an interior region, an intermediate region and a peripheral region. The interior region may comprise the central tube, optionally a layer of a base wrap, and the portion of the membrane sleeves and permeate carrier sheets that are proximal to the central tube. The intermediate region may include membrane sleeves and the permeate carrier sheets. The peripheral region may comprise a peripheral portion of the permeate carrier sheets.

Optionally, the spiral wound membrane element also includes at least one anti-telescoping device (ATD) that is positioned at one end, or both ends, of the membrane element to prevent the telescopic unraveling of the membrane element. The ATD may provide fluid communication between the central tube and the peripheral region.

During use, the spiral wound membrane element may accumulate particles from the feedstock on the inner surface of the membrane sheets. This accumulation is also referred to as fouling. Fouling of the membrane sheets may decrease permeate production of the spiral wound membrane element. The spiral wound membrane element may be cleaned, also referred to as de-fouled, by direct osmosis.

In a typical direct osmosis processes a low-solute solution exits the perforated central tube and enters the open edge of the membrane leaves to access the permeate carrier sheets. A higher-solute solution is introduced into the feed spacers. The discrepancy in solute concentrations on the two sides of the membrane sheet creates an osmotic gradient, also referred to as a concentration gradient, between the permeate carrier sheets and the feed spacer. The concentration gradient causes solvent from the low-solute solution to flow through the membrane sheet and into the higher-solute solution. The flow of solvent through the membrane is also referred to as solvent flux. The solvent flux may dislodge, remove, or clean some, or a significant portion, of the foulants adhered on the inner surface of the membrane sheet. Direct osmosis cleaning may continue until the solute concentrations between the permeate side and the feed side of the membrane sheet equilibrate.

The flow rate of the low-solute solution through the permeate carrier is typically slower than the flow rate of the higher-solute solution through the feed spacers. Due to this flow rate disparity, the osmotic gradient tends to centrally form in the interior region and portions of the intermediate region that are closest to the interior region. This centralization likely occurs because the low-solute solution has not had enough time to flow through the permeate carrier to reach further away from the central tube. The centralization of the osmotic gradient typically results in a centralized cleaning of foulants. The portions of the membrane sheet that were not exposed to the osmotic gradient often remain fouled.

Introducing the low-solute solution to both the interior region and the peripheral region of the spiral wound membrane element may increase the surface area of the membrane sheets that are exposed to the osmotic gradient, which may improve the efficiency of the direct-osmosis cleaning of the spiral wound elements.

DETAILED DESCRIPTION

The present disclosure describes a spiral wound membrane element that provides two permeate streams. The first permeate stream flows spirally inward to be collected within a central tube of the membrane element. The second permeate stream flows in the opposite direction, spirally outward to be collected from a peripheral region of the membrane element.

The present disclosure also describes a method of cleaning the spiral wound membrane element with two solutions of different concentrations for direct-osmosis cleaning of a spiral wound membrane sheet. The first solution may be introduced to both a central region and the peripheral region of a first side of the spiral wound membrane sheet. The second solution is introduced to the second side of the membrane sheet. An osmotic gradient is established between the two sides of the membrane sheet and solvent from the lower concentration solution moves across the membrane sheet to remove particles that are lodged on the side of the membrane sheet that contains the more highly concentrated solution.

Figure 1:
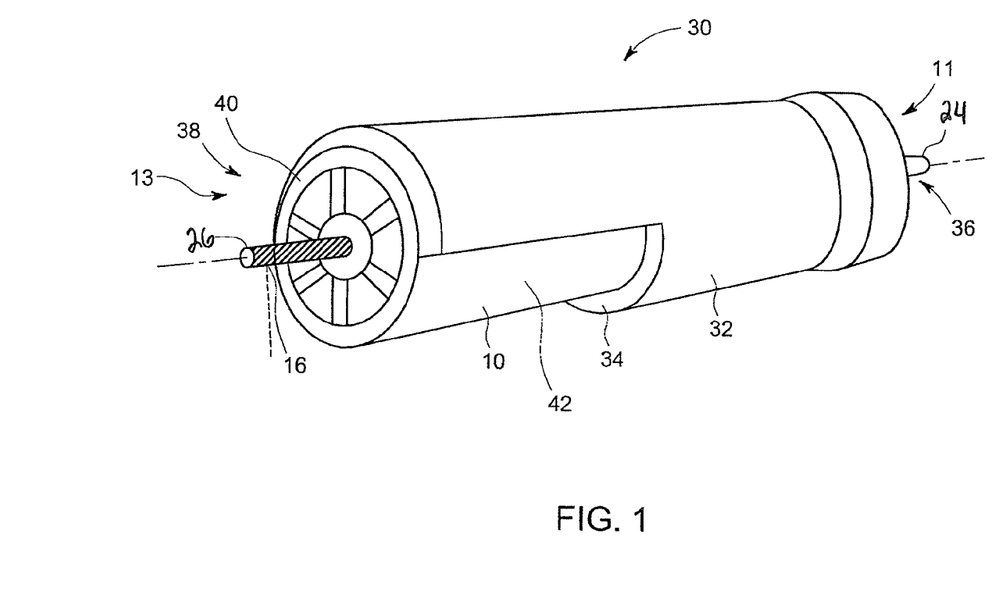
FIG. 1 is a partial cut-away, perspective view of a spiral wound membrane element.
Figure 2:
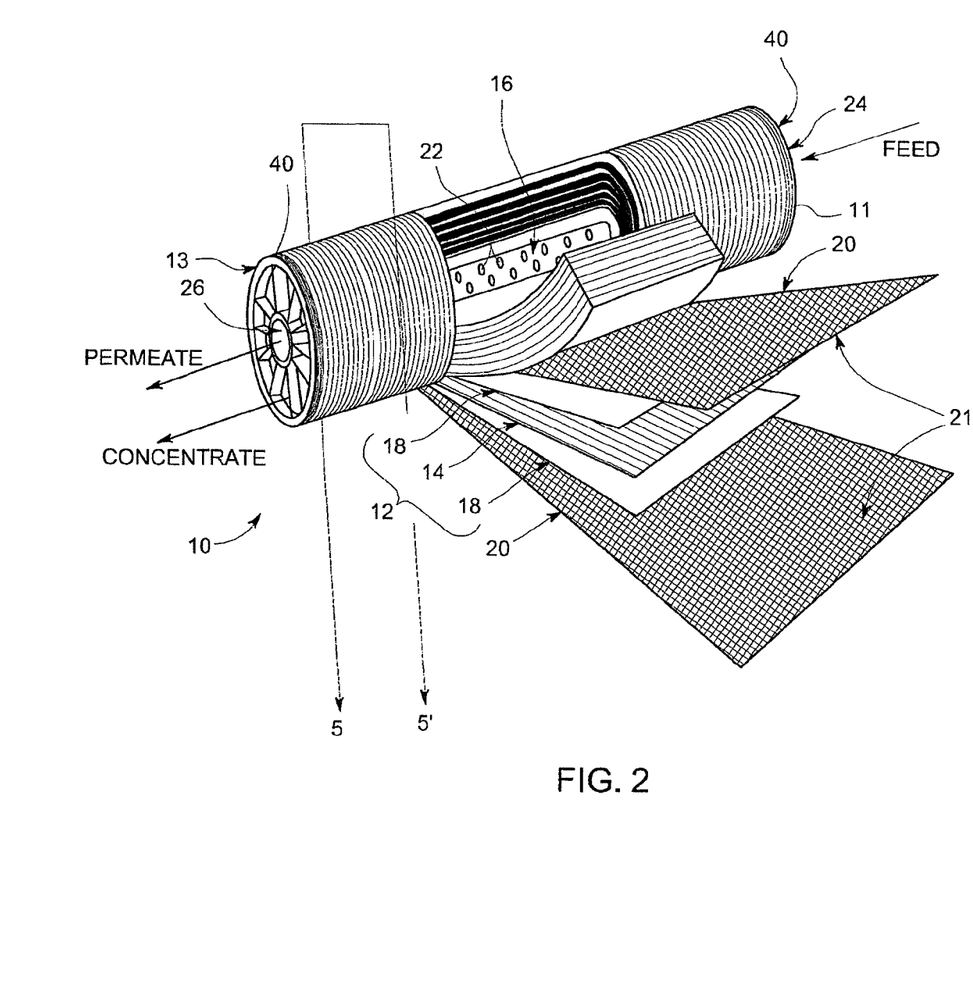
FIG. 2 is a partial cut-away, perspective view of a spiral wound membrane element.

Referring to FIGS. 1 and 2, a spiral wound membrane element 10 has an input end 11 and an output end 13. The spiral wound membrane element 10 may be formed by wrapping one or more membrane sleeves 12 and permeate carrier sheets 20 around a perforated central tube 16. The central tube 16 may also be called a core, a permeate tube or a produced water collection tube. The central tube 16 has a feedstock end 24 and a concentrate end 26. The perforations of the central tube 16 may comprise a plurality of holes 22. The holes 22 may have a diameter of approximately 0.125 inches (about 3.2 mm) and provide fluid communication between the permeate carrier sheets 20 and the inside of the central tube 16.

Figure 3:
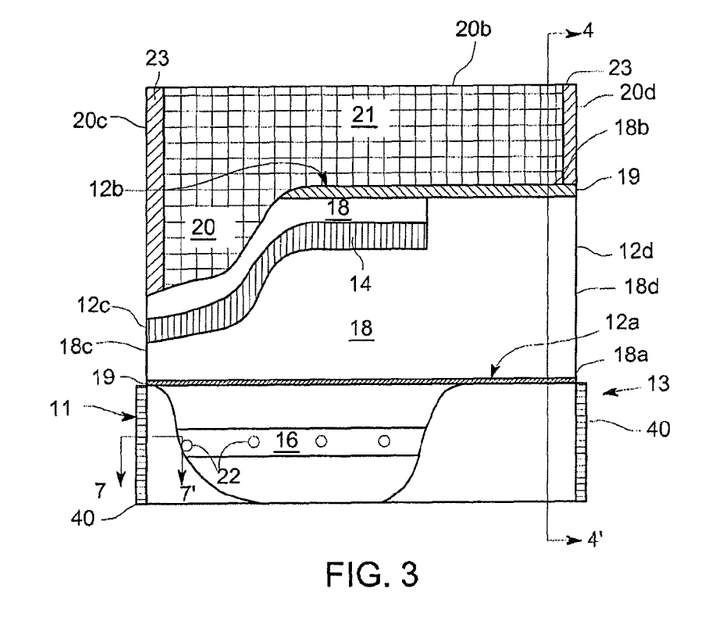
FIG. 3 is a partial cut-away, top plan view of a membrane sleeve and permeate carrier for use in the membrane element of FIG. 1.
Figure 4:
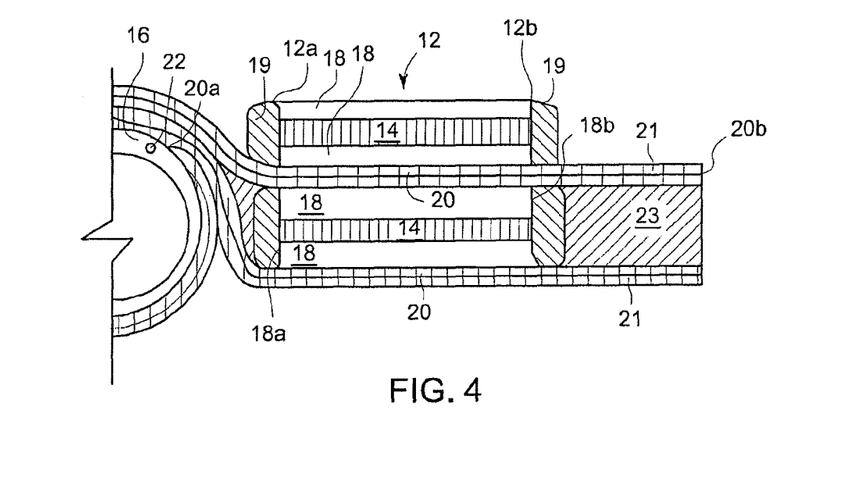
FIG. 4 is a cross-sectional view of a membrane sleeve taken through line 4-4' of FIG. 3.

As shown in FIGS. 2, 3 and 4, each membrane sleeve 12 includes two membrane sheets 18 with a feed spacer 14 between them. To form the membrane sleeve 12, the membrane sheets 18 have two sealed edges 18a and 18b that may be substantially parallel to each other. Edge 18a may be substantially parallel to and positioned adjacent to the central tube 16, as shown in FIG. 3. Two membrane sheets 18 may be sealed together at edges 18a and 18b by a seal 19, to form closed edges 12a and 12b of the membrane sleeve 12, as shown in FIG. 3 and FIG. 4. A variety of materials known in the art are suitable to be used as the seal 19, such as a glue line, provided seal 19 does not permit fluid communication across edges 12a and 12b. Each membrane sleeve 12 also includes two open edges 12c and 12d that are substantially perpendicular to edges 12a and 12b. The feed spacer 14 is positioned within the membrane sleeve 12 and between the two membrane sheets 18 so that an inner surface of each membrane sheet 18 is adjacent the feed spacer 14. The feed spacer 14 is in fluid communication with the input end 11 and the output end 13 of the spiral wound membrane element 10.

The sealed edges 18a and 18b of the membrane sheets 18, with the feed spacer 14 therebetween, form the membrane sleeve 12 with closed edges 12a and 12b and open edges 12c and 12d.

The feed spacer 14 acts as a conduit for a feedstock solution to flow through the membrane sleeve 12 and across the inner surface of the membrane sheets 18. The feedstock can generally flow from input end 11 to output end 13 of element 10, flowing between the open edges of the membrane sleeve 12.

The membrane sheets 18 have a separation layer cast onto a supporting or backing layer. The separation layer may be, for example, cellulose acetate, a polyamide, a thin film composite or other materials that may be formed into a separation membrane. The separation layer may have pores, for example, in the reverse osmosis, nanofiltration or ultrafiltration range so that the desired molecules from the feedstock may pass through the membrane sheet 18 and enter into a permeate stream. The separation layer forms the inner surface and faces the feedstock within the feed spacers 14. Opposite to the separation layer is the backing layer, which is adjacent the permeate carrier sheets 20. The backing layer may also be referred to as the permeate surface of the membrane sheets 18.

The permeate carrier sheet 20 is generally rectangular with open edges 20a and 20b that are substantially parallel to closed edges 12a and 12b of the membrane sleeve 12. The permeate carrier sheet 20 also has two closed edges 20c and 20d that are substantially parallel to the open edges 12c and 12d of the membrane sleeve 12. Closed edges 20c and 20d are sealed by a seal 23. A variety of materials known in the art are suitable to be used as the seal 23, such as a glue line, provided seal 23 does not permit fluid communication across the permeate carrier sheet 20 at the edges 20c and 20d. The glue may saturate between adjacent membrane sleeves 12 and seal 23 may generally extend about 1 to 5 cm from edges 20c and 20d of the permeate carrier sheet.

FIG. 4 shows the permeate carrier sheet 20 positioned between two membrane sleeves 12 and a second permeate carrier 20 below. At edge 20a, the permeate carrier sheet 20 is in fluid communication with small holes 22 in the central tube 16. Optionally, an additional permeate carrier sheet, which might or might not be the same material as the permeate carrier sheet 20, or an extension of the permeate carrier sheet 20, can be wrapped around the central tube 16 in one or more layers before the first membrane sleeve 12 is attached to the central tube 16. This initial wrap of permeate carrier sheet 20 supports the membrane sleeve 12 over the holes 22 and provides a path to conduct permeate from the permeate carrier sheet 20 to the holes 22 in the central tube 16.

The permeate carrier sheet 20 also includes a permeate carrier sheet extension 21 that extends away from edge 20a such that edge 20b does not coincide with the closed edge 12b of the membrane sleeve 12 (see FIGS. 3 and 4). The permeate carrier sheet extension 21 may extend distally from edge 20a, past edge 18b of membrane sheet 18. The permeate carrier sheet extension 21 may extend sufficiently past the closed edge 12b of the membrane sleeve 12 to prevent two adjacent membrane sleeves 12 from coming in contact with each other. For example, the permeate carrier sheet extension 21 may extend approximately 1 cm to 10 cm, or 2 cm to 4 cm, past the edge 12b of an adjacent membrane sleeve 12, as will be described further below.

Figure 5A:
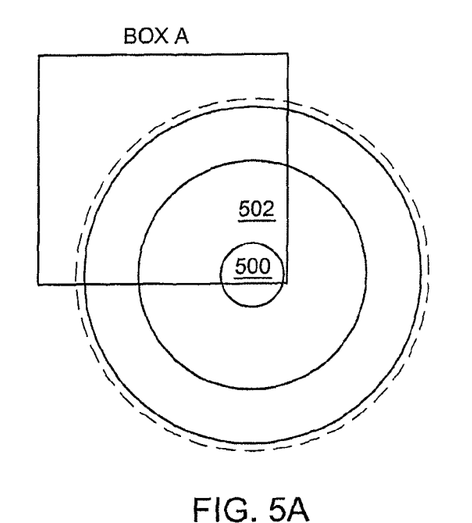
FIG. 5A is a cross-sectional, schematic of the spiral wound membrane element of FIG. 2 taken through line 5-5'.

When forming the membrane element 10, one or more membrane sleeves 12, for example 1 to 40, and one or more of permeate carrier sheets 20, are wrapped around the central tube 16. Each membrane sleeve 12 has an associated permeate carrier sheet 20, for example, the one or more membrane sleeves 12 may be in a one to one ratio with the associated permeate carrier sheets 20. When the membrane element 10 is wrapped and viewed in cross-section, as in FIGS. 5A and 5B, the area proximal to the central tube 16 generally defines an interior region 500 of the membrane element 10. The interior region 500 includes the bore of the central tube 16, the wall of central tube 16 and the one or more layers of permeate carrier that may form an initial wrap around the central tube 16 (as shown in FIG. 4). An intermediate region 502 is formed adjacent the interior region 500 and it comprises one or more wound layers of the plurality of membrane sleeves 12 and the permeate carrier sheet 20. Although not shown in FIG. 5A or 5B, the intermediate region typically comprises at least four membrane sleeves 12 and at least four permeate carrier sheets 20 each extending from the interior region 500 and wrapping around the interior region 500. Adjacent the intermediate region 502 is a peripheral region 504 of the membrane element 10. The peripheral region 504 comprises the termination point of the edges 12b of the membrane sleeves 12, the termination point of the edges 20b of the permeate carrier sheets 20, the permeate carrier sheet extensions 21 and an outer wrap 42. The peripheral region 504 is generally denoted as the region between the dotted line in FIGS. 5A and 5B and the intermediate region 502.

Figure 5B:
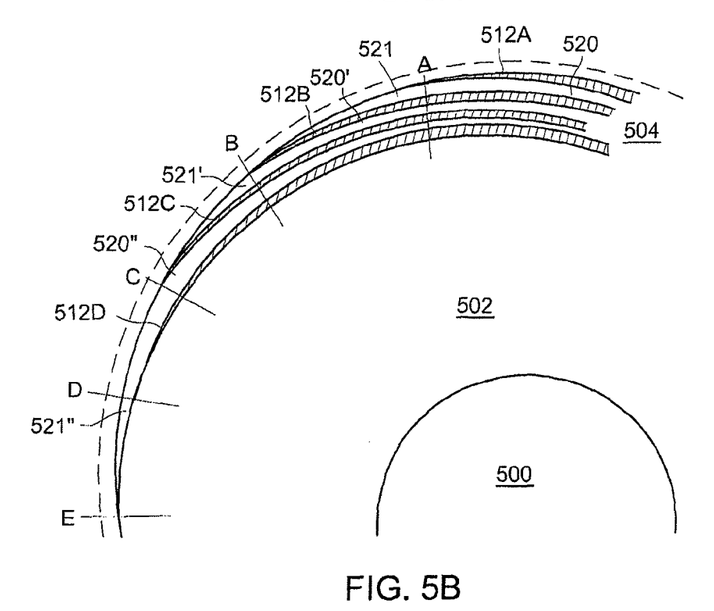
FIG. 5B is a close view of Box A, of FIG. 5A.

After winding the membrane sleeves 12 and the permeate carrier sheets 20 around the central tube 16, the edge 12b of one membrane sleeve 12 does not line up with the edge 12b of the adjacent membrane sleeve. As depicted in FIG. 5B, lines A, B, C and D each approximately indicate the termination point of edge 12b of each of the four membrane sleeves 512A, 512B, 512C and 512D, respectively. For example, the distance between lines A and B and reflects the approximate distance between edge 12b of membrane sleeve 512A and membrane sleeve 512B along the curved surface of the spiral wound membrane element 10. This space is caused by the membrane sleeves 12 being generally of the same dimensions, but each of the membrane sleeves 12 is attached at edge 12a at a different point within the interior region 500, either connected with the initial wrap of permeate carrier sheet 20 or directly connected to the central tube 16 (not shown).

When the spiral wound membrane element 10 is wrapped around the central tube 16, each individual permeate carrier sheet 20 may be adjacent a lower membrane sleeve 12 and an upper membrane sleeve 12. The individual permeate carrier sheet 20 is positioned on top of the lower membrane sleeve 12 and below the upper membrane sleeve 12 so that the upper membrane sleeve 12 and the lower membrane sleeve 12 do not come in contact. For example, as shown in FIG. 5B, the permeate carrier 520 is positioned upon lower membrane sleeve 512B and beneath upper membrane sleeve 512A. The permeate carrier sheet extension 521 is shown as extending beyond the edge 12B of the upper membrane sleeve 512A (shown as line A in FIG. 5B) but not extending to meet the edge 12B of the lower membrane sleeve 512B (shown as line B in FIG. 5B). The permeate carrier sheet extensions 21 form an outer permeate carrier layer or series of stripes that at least partially overlie the membrane sleeves 12.

When the spiral wound membrane element 10 is wrapped around the central tube 16, the permeate carrier sheet 20 provides a first flow path for the permeate stream that proceeds in an inward spiral fashion, around and towards the central tube 16. Referring back to FIG. 5B, the permeate that crosses through the membrane sheets 18 of membrane sleeves 512A and 512B will collect and travel within the permeate carrier sheet 520 on the first flow path towards the interior region 500.

The permeate carrier sheet 20 also provides a second flow path for the permeate stream that flows in an outward spiral fashion around, but away from, the central tube 16. Permeate that follows the second flow path travels through the permeate carrier sheet 20 and the permeate carrier sheet extension 21 towards open edge 20b and generally towards the peripheral region 504 of the spiral wound membrane element 10. In reference to FIG. 5B, some of the permeate that crosses through the membrane sheets 18 of membrane sleeves 512A and 512B will collect and travel within the permeate carrier sheet 520 on the second flow path towards the peripheral region 504. As will be discussed further below, permeate that follows this second permeate flow path is collected from the peripheral region 504 by the anti-telescoping device 40. The glue line 23 ensures that permeate can only exit the permeate carrier sheet 20 by the open edge 20a to follow the first permeate stream to the central tube 16 or by the open edge 20b or the permeate carrier sheet extension 21 to the peripheral region 504 and ultimately to an anti-telescoping device 40.

Further, when the spiral wound membrane element 10 is wrapped around the central tube 16, the glue line 23 ensures that there is no fluid communication between the outside of edges 11 and 13 of the spiral wound membrane element 10 and the permeate carrier sheet 20.

As shown in FIGS. 1 and 3, an anti-telescoping device (ATD) 40 is positioned at ends 11 and 13 of the spiral wound membrane element 10. The ATD 40 prevents the membrane sleeve from being pushed along the length of the center tube 18 by pressure gradients within the spiral wound membrane element 10. The ATD 40 is secured to the central tube 16 by glue, tape, the outer wrap 42 or other suitable known methods.

An outer wrap 42 is secured about the spiral wound membrane element 10 to assist the ATD 40 in the prevention of unwinding during use. The outer wrap 42 is made of materials impermeable to permeate flow, for example a plastic sheet or fiber-reinforced plastics such as fiberglass embedded in epoxy. The outer wrap 42 is in contact with the exterior or outer surface of the permeate carrier sheet extensions 21 and the wrap 42 is sealed at each end to the outside of the ATD 40.

Figure 7:
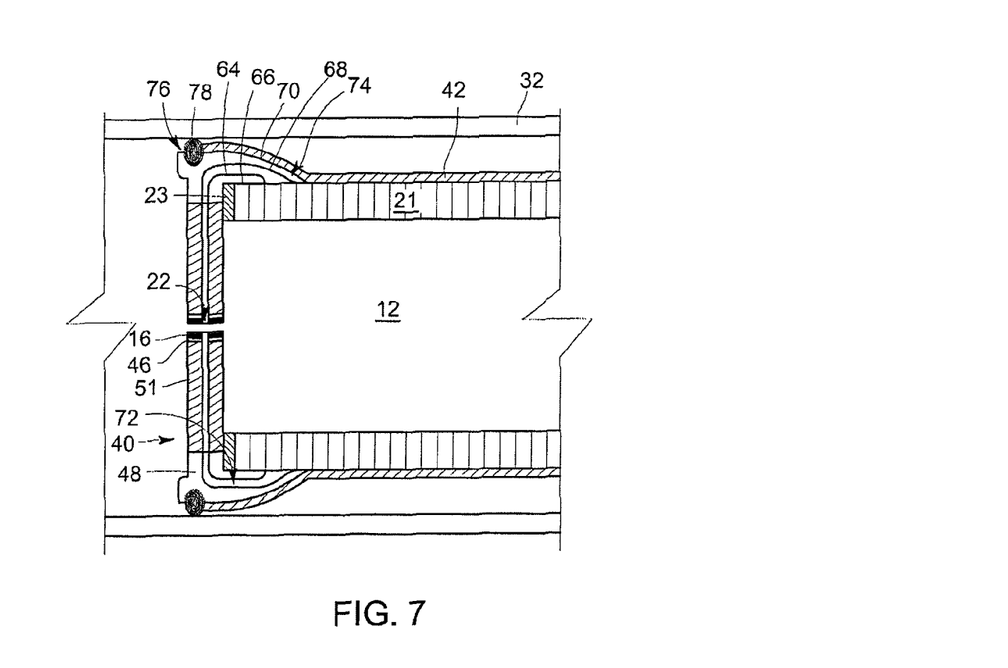
FIG. 7 is a cross-sectional view of the anti-telescopic device taken through line 7-7' of FIG. 1.

The ATD 40 includes an outer annular body 48 that is positioned proximate to the outer most layer of the permeate carrier 20. The outer annular body 48 includes a recess 72 along its circumference that faces the peripheral region 504, including the outer surface of the permeate carrier sheet extensions 21. The outer annular body 48 includes a permeate receiver 58 that extends from the outer annular body 48 between the outer wrap 42 and the outer surface of the permeate carrier sheet extensions 21, as shown in FIG. 7. The permeate receiver 58 includes an inner flange 60 and an outer flange 62, defining a recess 72 therebetween. Each flange, and therefore the recess 72, extends around the circumference of the outer annular body 48. The inner flange 60 has an inner surface 66 and an outer surface 64. Similarly, the outer flange has an inner surface 68 and an outer surface 70. The outer surface 64 of the inner flange 60 is adjacent the outer surface of the permeate carrier sheet extensions 21. The outer surface 70 of the outer flange 62 is adjacent the outer wrap 42.

The outer flange 62 of the permeate receiver 58 extends beyond the inner flange 60, as in FIG. 7. For example, the outer flange 62 includes a leading, beveled edge 74 that extends beyond the inner flange 60 to make contact with the outer surface of the permeate carrier sheet extension 21 to direct the second permeate flow from the peripheral region 504 into the recess 72 of ATD 40. The leading edge 74 also provides a greater surface area for securing ATD 40 to the spiral wound membrane element 10 with the outer wrap 42.

Figure 6:
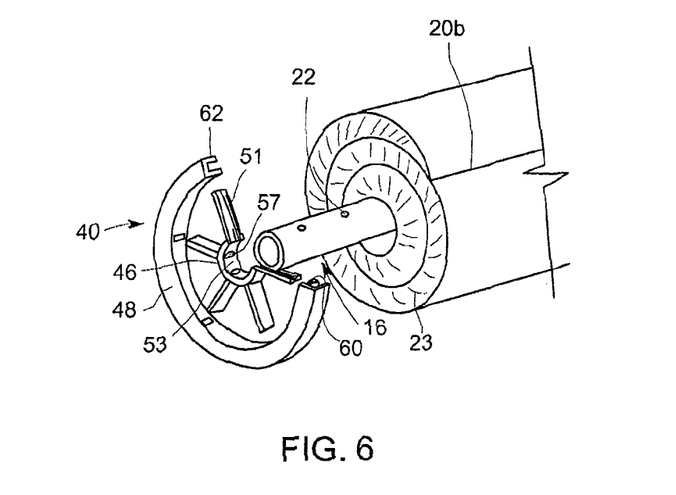
FIG. 6 is a cut-away, exploded, perspective view of an anti-telescoping device for use with the spiral wound membrane element of FIG. 1.

As shown in FIGS. 6 and 7, the ATD 40 also includes an inner annular body 46 with at least one elongate hollow member 51 connecting the two annular bodies 46, 48 of ATD 40. For example, the ATD 40 may resemble a wagon wheel structure, as depicted in FIG. 6, and includes fluid flow channels through the hollow members 51 that allow fluidic communication between the outer annular body 48 and the inner annular body 46.

The inner surface 53 of the inner annular body 46 may be proximal to, connected to or affixed to the outer surface 54 of the central tube 16. The inner annular body may include one or more ports 57 that provide fluid communication across the inner annular body 46 to the central tube 16. The ports 57 provide fluid communication with at least one of the small holes 22 of the central tube 16. Each port 57 is in fluid communication with an elongate hollow member 51 that in turn is in fluid communication with the recess 72 of the outer annular body 48 of ATD 40. Thereby a fluid passage from the peripheral region 504 to the interior region 500 is formed. For example, the flow passage may include the recess 72, elongate hollow member 51, and ports 57 of ATD 40.

Permeate that follows the second permeate flow stream travels spirally towards edge 20b of the permeate carrier sheet extension 21, generally towards the peripheral region 504 and is collected in the outer annular body 48 of the ATD 40 and conducted through the elongate hollow member 51, through the inner annular body 46 and via ports 57, into the central tube 16.

In reference to FIG. 1, a spiral wound membrane module 30 has a spiral wound membrane element 10 located inside of a pressure vessel 32. The pressure vessel 32 can be a pressure vessel as typically used with spiral wound membrane elements. The pressure vessel 32 has a generally tubular body 34 with an inlet end 36 that is adjacent the input end 11 of the spiral wound membrane element 10. The pressure vessel 32 also has an outlet end 38, adjacent outlet end 13 of the spiral wound membrane element 10 and the concentrate end 26 of the central tube 16.

The inlet end 11 and outlet end 13 of the spiral wound membrane element 10 are sealed and provide fluid communication with the interior of the pressure vessel 32. Peripheral seals may be provided between an outer wrap 42 of the element 10 and the inside of a pressure vessel 32 to prevent fluid communication past a spiral wound membrane element 10 without passing through its feed spacers 14. Further, the glue line 23 prevents direct fluid communication from the inlet end 36 to the permeate carrier sheet 20.

In an additional optional feature, the outer annular body 48 may also include a gland 76 and seal 78, for example an o-ring seal, that may be located opposite to the permeate receiver 58. The seal 78 forms a seal against the inner surface of the pressure vessel 32. For example, gland 76 and seal 78 may seal against leakage of any permeate and leakage of feedstock from passing around the spiral wound membrane element 10.

In an additional optional feature, the permeate carrier sheet extension 21 may extend to the edge 12b of the lower membrane sleeve 12 that is adjacent the permeate carrier sheet 20. In reference to FIG. 5B, the permeate carrier sheet 521' includes the permeate carrier sheet extension 521' that extends the distance between lines B and C to meet the outermost edge 512b of membrane sleeve 512C. With this additional optional feature, the outer most layer of permeate carrier 21, as shown in FIG. 7, is not a contiguous layer of permeate carrier sheet 20 in contact with the outer wrap 42. Rather, the permeate carrier sheet extensions 21 form a set of discontinuous bands or stripes of permeate carrier sheet extensions 21 that extend from input end 11 to output end 13 of the spiral wound membrane element 10 sealed by glue line 23 at each end.

In an additional optional feature, the permeate carrier sheet extension 21 may extend beyond the edge 12b of the lower membrane sleeve 12. In reference to FIG. 5B, the permeate carrier sheet 521" includes the permeate carrier sheet extension 521" that extends beyond the distance between lines C and D and therefore beyond the outermost edge 512b of the membrane sleeve 512D. In this optional feature, the permeate carrier sheet extension 521" extends to meet line E which is beyond line D. With this additional optional feature, the individual permeate carrier sheets may extend past the edge 20b of the lower membrane sleeve to come in direct contact with the next permeate carrier sheet. For example, in reference to FIG. 5B, the permeate carrier sheet extension 521' may extend past line C towards line D (not shown) and contact permeate carrier sheet extension 521". Thereby a contiguous outer layer of permeate carrier sheet extensions 21 that have an outer surface in direct contact with the outer wrap 542 is formed, as shown in FIG. 7.

In an additional optional feature, the permeate carrier sheet extension 21 may extend distally from edge 20a to approximately 1 to 5 cm past edge 12b of the adjacent, lower membrane sleeve 12.

In an additional optional feature, more than one spiral wound membrane element 10 may be located within a given pressure vessel 32. Such multiple spiral wound membrane elements 10 can be connected in series. The first end 11 of the first spiral wound membrane element 10 is either sealed, directly exits the pressure vessel 32 or is connected to a fitting that exits the pressure vessel 32 to receive feedstock. If there are multiple elements 10 in a pressure vessel 32, the second end 13 of an upstream element 10 is typically connected to the first end 11 of a downstream element. The second end 13 of the last spiral wound membrane element 10 in a pressure vessel 32 is either sealed, directly exits the pressure vessel 32 or the end 13 is connected to a fitting that exits the pressure vessel 32. Peripheral seals may be provided between the outer wrap (not shown) of the element 10 and the inside of a pressure vessel 32 to prevent feedstock from flowing past an element 10 without passing through the feed spacers 14 of the membrane sleeve 12.

In an additional optional feature, the membrane sleeve 12 is formed by one single membrane sheet that is folded at edge 18a and sealed at edge 18b, resulting in a membrane sleeve, with the feed spacer 14 positioned between the folded membrane. The folded edge 18a may be reinforced with a tape or film.

In an additional optional feature, the permeate carrier sheet extension 21 of the permeate carrier sheet 20 that terminates in the peripheral region 504 of the spiral wound membrane element 10 may be made of any other filler material, beside typical permeate carrier material such as netting, that is conducive to the flow of permeate fluids therethrough. With such an optional feature, a space containing the filler material within the peripheral region 504 may be formed between the outer surface of the permeate carrier sheet extension 21 and the inner surface of the outer wrap 42. Further optionally, a filler material may be wrapped over the outer surface of the permeate carrier sheet extensions 21. As described above, the permeate receiver of the ATD 40 may extend into this space to direct permeate from the second permeate flow path into the internal flow passage of the ATD 40 and into the central tube 16.

During filtration operations, the feedstock solution to be filtered enters through an inlet (not shown) at the inlet end 36 of the pressure vessel 32. Feedstock meets the edge 11 of the spiral wound membrane element 10. The feedstock cannot enter the permeate carrier sheet from either of the closed edges 20c and 20d. The feedstock enters the membrane sleeve 12 through open edge 12c and flows through the feed spacer 14 and across the inner surface of each membrane sheet 18. Once inside the membrane sleeve 12, the glue line 19 prevents the feedstock from exiting the membrane sleeve 12 at the closed edges 12a and 12b. The resulting direction of feedstock flow is from the open edge 12c to open edge 12d.

While feedstock flows through the membrane sleeve 12, permeate may pass through the inner surface of membrane sheet 18 to the permeate surface of the membrane sheet 18 that is adjacent the permeate carrier sheet 20 while the passage of dissolved salts or suspended solids or other contaminants may be rejected by the membrane sheet 18 depending on its pore size and carried away in a reject stream. The reject stream stays on the same side of the membrane sheets 18 as the feedstock, thereby concentrating the feedstock in rejected solutes so that a concentrated reject stream 114 leaves the pressure vessel 32 through a discharge tube (not shown) at the outlet end 38.

During the filtration operations, the inner surface of the membrane sheet 18 may become fouled by particles in the feedstock, also referred to as foulants, which are adhered to, lodged within, or stuck on the inner surface of the membrane sheet 18. The foulants may plug the pores of the membrane sheets 18 and decrease the flow of permeate through the inner surface of the membrane sheet 18. The foulants may also provide a substrate for further particles to adhere to the inner surface of the membrane sheet 18.

As the feedstock moves along the inner surface of the membrane sheet 18, permeate passes through the membrane sheet 18 and collects on the opposite side of the membrane sheet 18 from the reject stream. For example, permeate passes through the inner surface of the membrane sheets 18 and exits the membrane sleeve 12 while the reject stream remains within the membrane sleeve 12 until discharged. The permeate collects within spaces within the permeate carrier sheet 20. The closed edges 20c and 20d of the permeate carrier sheet 20 prevent permeate from exiting the permeate carrier sheet 20 except through the open edges 20a, 20b or the permeate carrier extensions 21. As described above, the flow of permeate fluids along the permeate carrier sheet 20 may occur in one or two, or both, directions.

The first permeate flow path follows the flow path typical for a spiral wound membrane element. In following the first permeate flow path, the permeate fluid may flow in a radial path that spirals inwardly towards the central tube 16. Edge 20a provides fluid communication with the holes 22 of central tube 16 so that permeate may collect inside of the central tube 16 and then typically travels in a stream directed from the feedstock end 24 to the concentrate end 26 of the central tube 16.

Permeate fluid also follows the second permeate flow path that is generally in the opposite direction to the first permeate flow path. For example, permeate fluid may follow a radial flow path that spirals outwardly, away from the central tube 16 towards the peripheral region 504 of the spiral wound membrane element 10. Permeate fluid following the second permeate flow path may travel along the permeate sheet 20, away from edge 20a, towards edge 20b. The permeate fluid following the second permeate flow path may travel along and lengthwise, through one or more of the permeate carrier sheet extensions 21 to be collected within the peripheral region 504 of the spiral wound membrane element 10, for example within the ATD 40.

During cleaning operations, two solutions may be introduced into the spiral wound membrane element 10. A first solution may be introduced into the central tube 16, preferably at the concentrate end 26, and the first solution may access the open edge 20a of the permeate carrier sheets 20 by the holes 22. Optionally, the feedstock end 24 of the central tube 16 may fluidly communicate with the outside of the pressure vessel 32 to allow introduction of the first solution at either or both ends of the central tube 16. The first solution may flow from the central tube 16, along the permeate carrier sheet 20 through the interior region 500. The first solution may also flow through holes 22 to communicate with the peripheral region 504 by way of the hollow member 51 of the ATD 40. The first solution may flow from the recess 72 of the ATD 40 and enter the permeate carrier sheet extensions 21 by the open edge 20b.

The first solution may flow within the permeate carrier sheets 20 from both the interior region 500 and the peripheral region 504 to enter into the intermediate region 502. The interior, intermediate and peripheral regions 500, 502, 504 may contain the first solution and substantially the whole permeate-side surface each membrane sheet 18 may be in contact with the first solution. The term "contact" refers to a solution that is adjacent a surface of the membrane sheet 18 so that under the influence of osmotic gradients or fluid pressures, or both, a solvent of the solution may flow through the membrane sheet 18. Further, the first solution may flow to the intermediate region 502 from both the interior region 500 and the peripheral region 504.

A second solution may be introduced to either the inlet end 36 or the outlet end 38, or both, of the pressure vessel 32. Preferably, only one end is used to introduce the second solution to the pressure vessel 32. Similar to the flow path of the feedstock during filtration operations, the sealed edges 12a, 12b of the membrane sleeve 12, and any peripheral seals, direct the second solution to flow through the feed spacers 14. The second solution flows along the inner surface of the membrane sheets 18 throughout the interior, intermediate and peripheral regions 500, 502, 504 of the spiral wound membrane element 10. The second solution may be in contact with substantially the whole of the inner surface of each membrane sheet 18.

The first and second solutions may be of different solute concentrations. The solute concentration difference between the two solutions may be sufficiently large so as to cause the movement, or flux, of solvent from one solution through the membrane sheet 18 into the other solution without any fluid pressure differential between the two solutions. When the first solution is in contact with the permeate surface of the membrane sheet 18 and the second solution is in contact with the inner surface of the membrane sheet 18 an osmotic gradient, also referred to as a concentration gradient, is created, or generated, between the permeate surface and the inner surface of the membrane sheet 18. For example, both the first and second solutions may be a saline solution and the concentration of solute in the first solution is lower than the second solution. The difference in concentrations will move solvent, for example water, from the first solution from the permeate carrier sheets 20, across the membrane sheets 18 into the second solution. The movement of solvent through the membrane sheet due to the osmotic gradient is also referred to as solvent flux. The solvent flux may dislodge, remove or clean foulants from the inner surface of the membrane sheets 18. The solvent flux may continue until an osmotic equilibrium is established between the first solution and the second solution.

The first solution may be introduced prior to, after, or at the same time as the introduction of the second solution. Permeate remaining in the membrane element 10 may function as the first solution until it is drawn through the membrane sheets and replaced with new first solution. Preferably, the second solution is not introduced until the first solution has established contact with the permeate carrier sheets 20 through all of the interior, intermediate and peripheral regions 500, 502, 504 of each spiral wound membrane element 10 within a given pressure vessel 32. In this way, the osmotic gradient will be established between the permeate surface and the inner surface along substantially the entire area of all membrane sheets 18.

Figure 8:
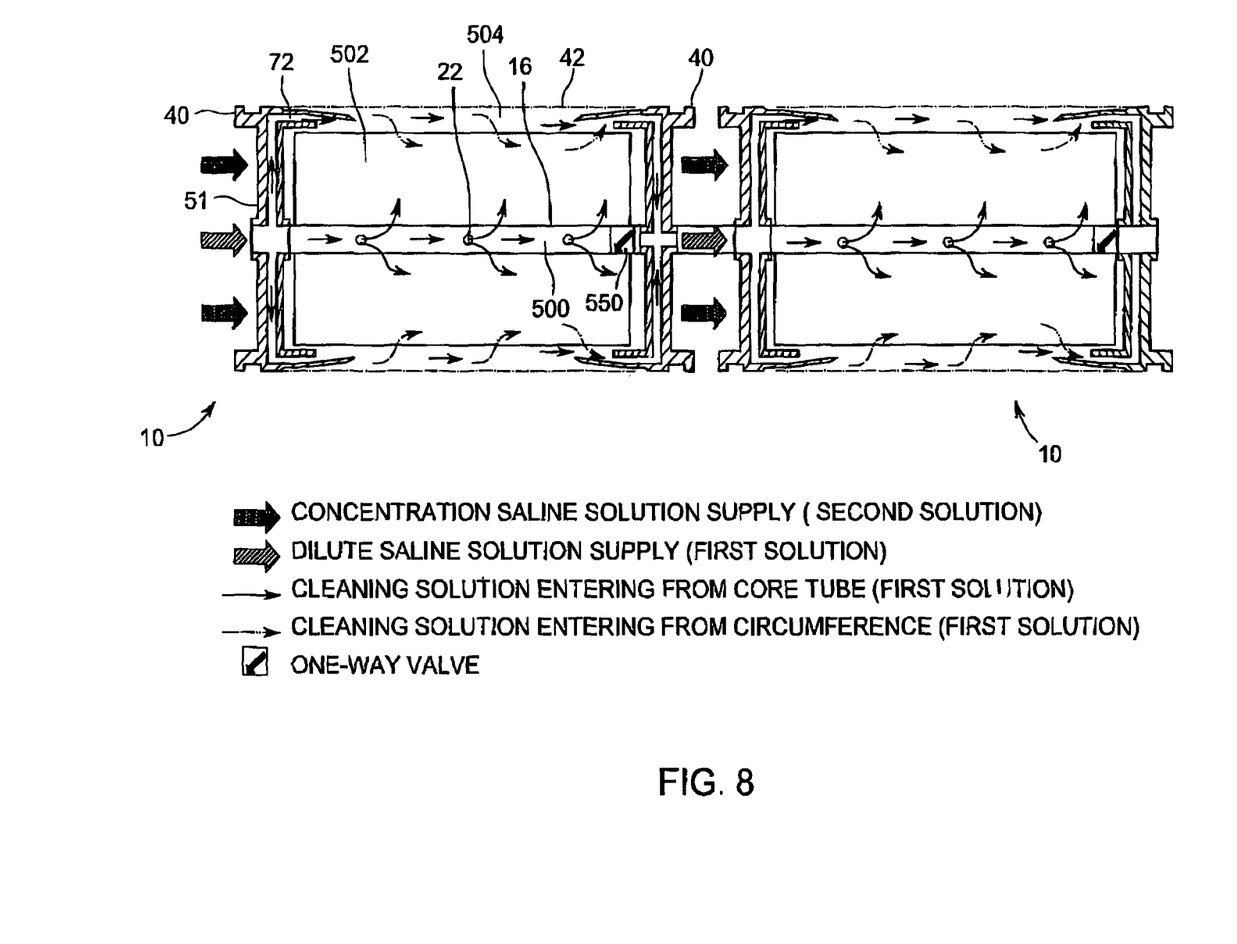
FIG. 8 is a cross-sectional view of two spiral wound membrane elements connected in series.

Optionally, as shown in FIG. 8, a flow restriction may be located within the central tube 16 at, or near, the opposite end of the membrane module 10 where the first solution is introduced. In this option, the first solution is preferably introduced at one end of the central tube 16 only. For example, the first solution is introduced at the concentrate end 26 and the flow restriction is positioned near the feed stock end 24. The flow restriction restricts the first solution from flowing along the longitudinal axis of the central tube 16 and directs the first solution to flow out through the holes 22. A portion of the first solution will access the permeate carrier sheets 20 by the open edge of the membrane leaves 12 that is adjacent the central tube 16. Another portion of the first solution may access the permeate carrier sheets 20 by flowing through the ATD 40 and contacting the distal edge 20b of the permeate carrier sheets 20. The flow restriction may be a one-way valve 550 that directs the first solution through the holes 22 but does not significantly impede the flow of permeate through the central tube 16 during filtration operations. Optionally, the feed stock end 24 of the series of membrane elements 10 may be used to withdraw permeate from the membrane elements 10 while first solution is added to the concentrate end 26 so as to allow the intermediate regions 502 to be flushed of permeate and filled with first solution before the second solution is applied to the membrane elements 10.

As described above, multiple spiral wound membrane elements 10 may be within one pressure vessel 32. The multiple spiral wound membrane elements 10 may be connected in series and share a common central tube 16 with a flow restriction for each spiral wound membrane element 10. Preferably the section of the central tube 16 that extends between adjacent spiral wound membrane elements either has no holes 22, or the holes 22 are plugged, to prevent the loss of fluids between adjacent spiral wound membrane elements 10. In this option, the first solution may be directed through the holes 22 by the flow restriction and at least a portion of the first solution in the peripheral region 504 will enter the recess 72 of the ATD 40 that is located at the same end of the spiral wound membrane element 10 as the flow restriction. This portion of the first solution may flow from the peripheral region 504 through the hollow member 51 and into the central tube 16 between adjacent spiral wound membrane elements 10. This portion of the first solution will then enter the adjacent spiral wound membrane element 10 and the flow restriction therein will direct the first solution to flow through the holes 22.

It is to be understood that references herein to spiral or radial permeate flow do not exclude the edgewise permeate flow, that is flow in the direction that connects edges 20c and 20d, through the permeate carrier sheet. The two reverse flow paths 119 and 120 may be strictly opposite only in a plane perpendicular to the length of the spiral wound membrane element 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. A spiral wound membrane element, comprising:
a perforated central tube with a flow restriction at one end;
one for more membrane sleeves, each of the one or more membrane sleeves comprising two membrane sheets enclosed at two edges around a feed spacer sheet and wrapped around the central tube;
one or more permeate carrier sheets attached to the perforated central tube at a first edge opposite a second edge, wherein the one or more permeate carrier sheets and the one or more membrane sleeves are in a 1:1 ratio, respectively;
a seal on a third edge and a fourth edge of each of the one or more permeate carrier sheets, extending from the first edge to the second edge wherein the one or more membrane sleeves and each of the one or more permeate carrier sheets are wrapped in a spiral and the second edge of each of the one or more permeate carrier sheets is open and extends beyond each of the one or more membrane sleeves lying over each of the one or more permeate carrier sheets in a peripheral region of the spiral wound membrane element such that each of the one or more permeate carrier sheets is in fluid communication with the perforated central tube and the peripheral region of the spiral wound membrane element; and
an anti-telescoping device secured to each of end of the perforated central tube, the anti-telescoping device comprising a passage that communicates between the peripheral region of the spiral wound membrane element and inside of the perforated central tube.

2. The spiral wound membrane element of claim 1, further comprising an outer wrap that wraps around each of the one or more membrane sleeves and each of the one or more permeate carrier sheets.

3. The spiral wound membrane element of claim 1, wherein the flow restriction is a one-way valve.

4. A method for cleaning a spiral wound membrane element comprising:
- a perforated central tube with a flow restriction at one end;
- one or more membrane sleeves, each of the one or more membrane sleeves comprising two membrane sheets enclosed at two edges around a feed spacer sheet and wrapped around the central tube;
- one or more permeate carrier sheets attached to the perforated central tube at a first edge opposite a second edge, wherein the one or more permeate carrier sheets and the one or more membrane sleeves are in a 1:1 ratio, respectfully;
- a seal on a third edge and a fourth edge of each of the permeate carrier sheets, extending from the first edge to the second edge wherein each of the one or more membrane sleeves and each of the permeate carrier sheets are wrapped in a spiral and the second edge of each of the permeate carrier sheets is open and extends beyond each of the one or more membrane sleeves lying over each of the permeate carrier sheets in a peripheral region of the spiral wound membrane element such that each of the permeate carrier sheets is in fluid communication with the perforated central tube and the peripheral region of the spiral wound membrane element; and
- an anti-telescoping device secured to each of end of the perforated central tube, the anti-telescoping device comprising a passage that communicates between the peripheral region of the spiral wound membrane element and inside of the perforated central tube, the method comprising:
- introducing a first solution to a first side of each of the membrane sheets of said spiral wound membrane element, wherein the first solution is introduced through a central region of each of the membrane sheets of said spiral wound membrane element and through a peripheral region of each of the membrane sheets of said spiral wound membrane element via the passage in the anti-telescoping device;
- introducing a second solution to a second side of each of the membrane sheets of said spiral wound membrane element, wherein the second solution has a higher solute concentration than the first solution;
- establishing a concentration gradient between the first and the second sides;
- communicating a first solvent from the first solution from the first side to the second side, wherein the first solvent removes a foulant located on the second side of each of the membrane sheets of said spiral wound membrane element; and
- collecting a waste stream that contains the foulant.

5. The method of claim 4, wherein the second solution is introduced after the first solution contacts substantially the whole first side each of the membrane sheets of said spiral wound membrane element.

6. The method of claim 4, wherein the second solution is introduced after permeate has been removed from the first side and replaced with the first solution.

7. The method of claim 4, wherein the flow restriction is a one-way valve.

* * * * *